(12) United States Patent
Lee et al.

(10) Patent No.: US 8,442,346 B2
(45) Date of Patent: May 14, 2013

(54) IMAGE PROCESSING METHOD AND ASSOCIATED APPARATUS FOR ADJUSTING AN EDGE PIXEL

(75) Inventors: Ruen-Rone Lee, Hsinchu Hsien (TW); Sheng Chi Yu, Hsinchu Hsien (TW); Tsai-Sheng Wang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 358 days.

(21) Appl. No.: 12/814,617

(22) Filed: Jun. 14, 2010

(65) Prior Publication Data

US 2010/0322531 A1 Dec. 23, 2010

Related U.S. Application Data

(60) Provisional application No. 61/218,077, filed on Jun. 18, 2009.

(51) Int. Cl.
*G06K 9/40* (2006.01)

(52) U.S. Cl.
USPC .......................................................... 382/266

(58) Field of Classification Search .................. 382/254, 382/266, 269, 275
See application file for complete search history.

(56) References Cited

U.S. PATENT DOCUMENTS

| | | | |
|---|---|---|---|
| 6,377,273 B1 * | 4/2002 | Lee et al. | 345/611 |
| 6,982,723 B1 * | 1/2006 | Szymaniak | 345/611 |
| 2010/0067782 A1 * | 3/2010 | Dunn et al. | 382/162 |

* cited by examiner

*Primary Examiner* — Edward Park
(74) *Attorney, Agent, or Firm* — Edell, Shapiro & Finnan, LLC

(57) ABSTRACT

An image processing apparatus and an associated method capable of effectively reducing image artifact at an edge of an image without excessively compromising overall system performance. The method includes calculating an intersection point of an edge of the image and a pixel scan line, estimating a relative ratio of the image within a pixel block corresponding to the intersection point to generate an adjustment parameter, and adjusting a pixel value of the pixel block according to adjustment parameter.

7 Claims, 10 Drawing Sheets

SL6   SL7   SL8   SL9   SL10   SL11

SL6   SL7   SL8   SL9   SL10   SL11

IMAGE PROCESSING METHOD AND ASSOCIATED APPARATUS FOR ADJUSTING AN EDGE PIXEL

CROSS REFERENCE TO RELATED PATENT APPLICATION

This patent application claims the benefit of a U.S. provisional patent application No. 61/218,077 filed on Jun. 18, 2009, which is incorporated herein by reference in its entirety.

FIELD OF THE INVENTION

The present invention relates to an image processing mechanism, and more particularly, to an image processing method for adjusting pixel values of pixels at an edge of an image and an associated apparatus.

BACKGROUND OF THE INVENTION

Referring to FIG. 18 showing a schematic diagram of image artifact associated with the prior art, an image comprises 5×5 pixel blocks, a bold straight line indicates an edge of the image, and the image is located at the right side of the bold straight line L. Although the image theoretically includes image blocks at the right side of the bold straight line L, since the pixels blocks are already in a smallest unit possible, the image edge L perceived by the human eye cannot be more accurately presented than as shown in FIG. 18, in which the edge of the image is illustrated by a plurality of dotted pixel blocks. However, such image processing results in obvious image artifact when actually perceived by the human eye; that is, the human eye in fact sees a jagged edge instead of a smooth, straight line. In a conventional solution for overcoming the image artifact, a pixel value of a particular pixel block is determined by oversampling the pixel block located at an edge of an image. For example, the pixel block is divided into a plurality of sub-blocks, and the pixel value of the pixel block is then determined after calculating the number of sub-blocks that belong to the image. Yet, the oversampling technique requires substantial and complicated mathematical computations and associated logic operations that inevitably impose excessive burdens on an overall image system. Particularly for a real-time image processing system, the oversampling technique can be undesirable. Therefore, a solution for overcoming the drawbacks of image artifact associated with the prior art is in need.

SUMMARY OF THE INVENTION

An object of the invention is to provide an image processing apparatus and an associated method capable of effectively solving image artifact at an edge of an image without excessively compromising overall system performance.

Therefore, the invention provides an image processing method for adjusting a pixel value of a pixel at an edge of an image. The image processing method comprises calculating an intersection point formed by an edge of the image and a pixel scan line, estimating a relative ratio of the image within a pixel block corresponding to the intersection point to generate an adjustment parameter, and adjusting a pixel value of the pixel block according to the adjustment parameter.

The invention further provides an image processing apparatus for adjusting a pixel value of a pixel at an edge of an image. The image processing apparatus comprises a calculation unit, for calculating an intersection point formed by an edge of the image and a pixel scan line; an estimation unit, for estimating a relative ratio of the image within a pixel block corresponding to the intersection point to generate an adjustment parameter; and an adjustment unit, for adjusting a pixel value of the pixel block according to the adjustment parameter.

Accordingly, the invention provides an advantage that, after a blurring processing with the image processing apparatus according to an embodiment of the invention, obvious image artifact is less likely perceived by the human eye leading to less visual discomfort. From a perspective of system performance, the calculation unit, the estimation unit and the adjustment unit of the image processing apparatus are operated based on simple mathematical calculations and logic operations. Hence, compared with conventional solutions that calculate ratios using the oversampling technique, the image processing apparatus according to the embodiment of the invention is capable of preventing over-compromising of overall system performance, which is advantageous in real-time image processing. Further, from a perspective of hardware, the image processing apparatus according to the embodiment of the invention is supported with simple modifications such that hardware cost is also significantly reduced.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
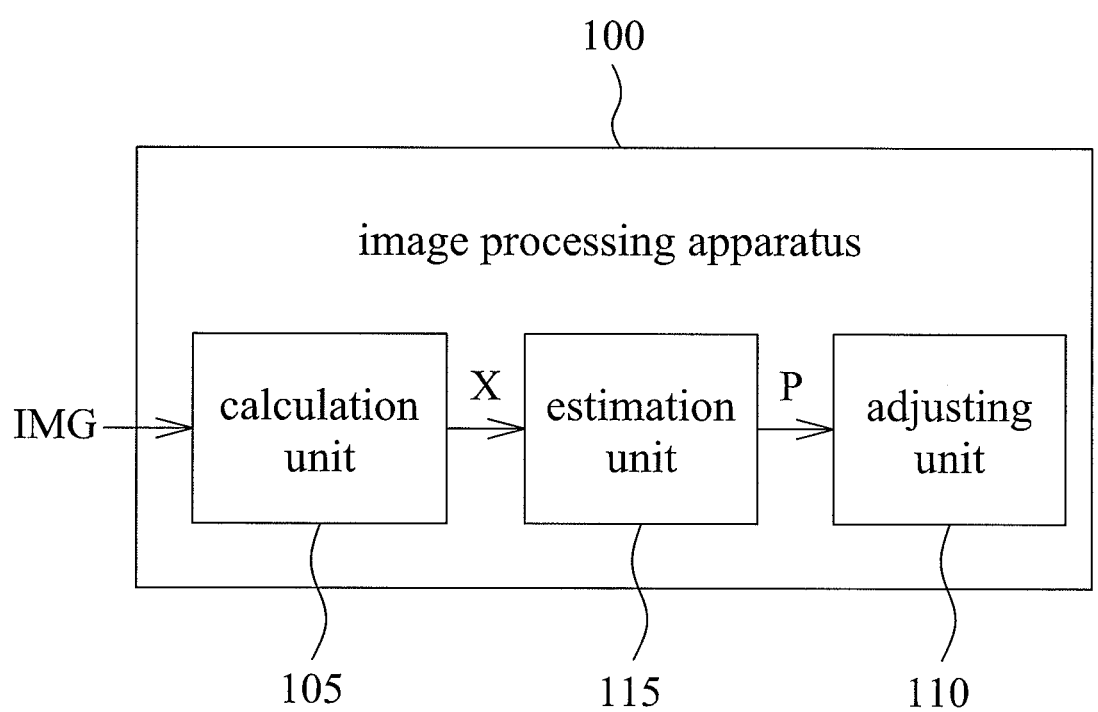
FIG. 1 is a schematic diagram of an image processing apparatus according to an embodiment of the invention.

FIG. 1 shows a schematic diagram of an image processing apparatus 100 according to an embodiment of the invention. The image processing apparatus 100 is for adjusting a pixel value of a pixel at an edge of an image to eliminate image artifact perceived at the edge of the image by the human eye, so as to prevent or minimize visual discomfort. The image artifact is a jagged-edge image, for example. In this embodiment, the image processing apparatus 100 comprises a calculation unit 105, an adjusting unit 110 and an estimation unit 115. The calculation unit 105 calculates an intersection point X formed by an edge of an image IMG and a scan line (e.g., a vertical scan line or a horizontal scan line). The estimation unit 115, coupled to the calculation unit 105, estimates a relative ratio of the image IMG within a pixel block corresponding to the intersection point to determine an adjustment parameter P. The corresponding pixel block indicates that the intersection point X is located in the pixel block or is situated at the edge of the pixel block. The adjusting unit 110 then adjusts the pixel value of the pixel block according to the adjustment parameter R More specifically, the calculation unit 105 calculates for coordinates of a plurality of intersection points respectively formed by a plurality of scan lines (e.g., vertical scan lines or horizontal scan lines) and the edge of the image IMG; for each pixel block situated at the edge of the image IMG, the estimation unit 115 estimates a ratio between in the pixel block an area that belongs to the image IMG and an area of the pixel block to generate an adjustment parameter P; and the adjustment unit 110 determines pixel values of the pixel blocks according to corresponding adjustment parameters R Accordingly, by adjusting the pixel values associated with the pixel blocks of a plurality of scan lines at the edge of the image IMG, the image processing apparatus 100 is able to eliminate the foregoing image artifact. Those skilled in the art will appreciate that the several units depicted in FIG. 1 may be implemented with hardware, software, firmware or combinations thereof.

Figure 2:
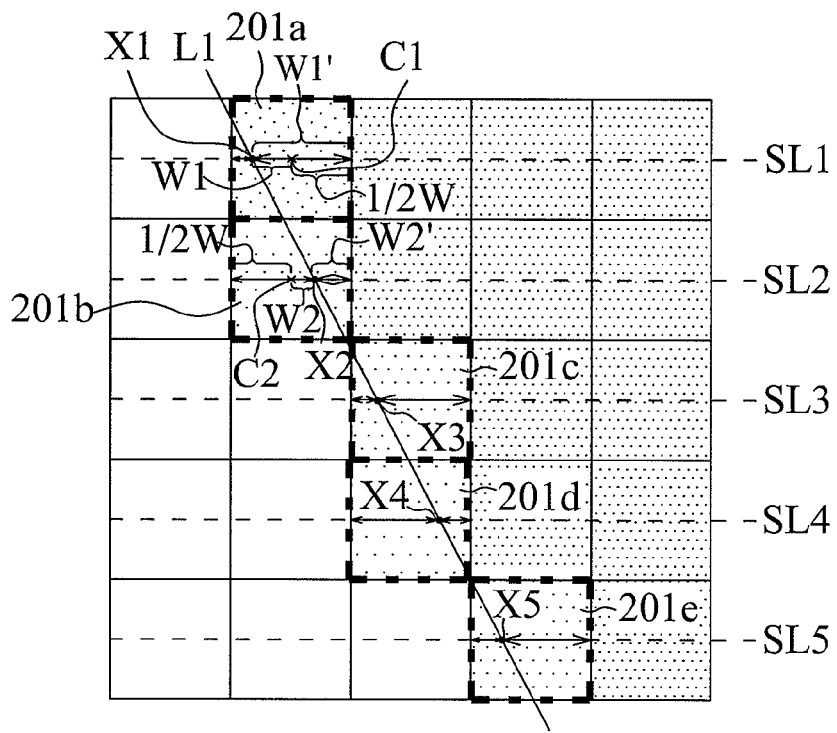
FIGS. 2 to 9 are schematic diagrams illustrating operations of the image processing apparatus shown in FIG. 1 according to a first embodiment of the invention.

An example of a straight edge is used to describe operations of the image processing apparatus 100 in an embodiment below since a jagged image often occurs at an image having a straight edge. However, the image processing apparatus 100 in FIG. 1 may also be applied to images having edges that approximate a straight line. FIGS. 2 to 9 show schematic diagrams of operations of the image processing apparatus 100 in FIG. 1 according to a first embodiment of the invention. As shown in FIG. 2, an image block comprises 5×5 pixel blocks, a bold straight line L1 represents an edge of an image IMG that is located at the right side of the bold straight line, and the image processing apparatus 100 is applied to process pixel values of five pixel blocks 201a~201e. Taking the pixel block 201a where an intersection point X1 is formed for example, the calculation unit 105 calculates a coordinate of the intersection point X1 formed by the edge L1 of the image IMG and a horizontal scan line SL1. Next, the estimation unit 115 judges a relative position relationship between the image IMG and the intersection point X1 according to the coordinate of the intersection point X1, so as to determine whether the image IMG within the pixel block 201a is situated at the right or left side of the intersection point X1. Based on the relative position relationship, the estimation unit 115 further estimates a ratio of a horizontal distance occupied by the image IMG from the intersection point X1 to a border of the pixel block 201a to a horizontal distance of the pixel block 201a. For example, the estimation unit 115, with reference to the coordinate of the intersection point X1 and a coordinate of a center C1 of the pixel block 201a where the intersection point X1 is formed, estimates the ratio of the image IMG within the pixel block 201 to calculate the adjustment parameter P. The adjustment unit 110 then adjusts the pixel value of the pixel block 201a according to the adjustment parameter P.

Details of how the estimation unit 115 calculates the adjustment parameter are given below. The estimation unit 115 first judges whether the image covers the center C1 of the pixel block 201 according to the relative position relationship (i.e., whether the image is situated at the right or left side of the intersection point X1), and determines the adjustment parameter according to a judgment result. More specifically, for the pixel block 201a, the estimation unit 115 first judges whether the image is situated at the right side of the intersection point X1 according to the relative position relationship to generate a judgment result, with reference of which the estimation unit 115 determines that the image covers the center C1 of the pixel block 201a. Next, the estimation unit 115 adds a width distance W1 between the intersection point X1 and the center C1 with a half of a width distance of the pixel block 201a to obtain a width W1', and divides the width W1' by the width distance W of the pixel block 201a to obtain the adjustment parameter, which is a final target adjustment parameter in the example of the pixel block 201a. Theoretically, taking the pixel block 201a with the center C1 falling within the image for example, as farther the intersection point X1 gets from the left side of the center C1, the larger the area occupied by the image in the pixel block is; on the contrary, as closer the intersection point X1 gets to the center C1, the smaller the area occupied by the image in the pixel block is. Therefore, by utilizing the adjustment parameter calculated based on the width distance W1' and the width distance W of the pixel block 201a, a total area occupied by the image in the pixel block 201a is effectively obtained. Since the total area occupied by the image in the pixel block 201a corresponds to a pixel value of the pixel block, the adjustment unit 110 can thus adjust the pixel value of the pixel block 201a according to the adjustment parameter determined by the estimation unit 115.

Further, for the pixel block 201b, the estimation unit 115 judges whether that the image is situated at the right side of an intersection point X2 according to a corresponding relative position relationship, and also determines that the image does not cover a center C2 of the pixel block 201b. Under the condition that the image does not cover the center C2 of the pixel block 201b, the estimation unit 115 subtracts a width distance W2 between the intersection point X2 and the center C2 from a half of a width distance W of the pixel block 201b to obtain a width W2'. The width W2' is then divided by the width distance W of the pixel block 201b to obtain the adjustment parameter, which is a final target adjustment parameter in the example of the pixel block 201b. Theoretically, supposing the image does not cover the center C2 of the pixel block 201b, as farther the intersection point X2 is situated gets from the center C2, the smaller the area occupied by the image in the pixel block is; on the contrary, as closer the intersection point X2 gets to the center C2, the larger the area occupied by the image in the pixel block is. Therefore, by utilizing the adjustment parameter calculated based on the width distance W2' and the width distance W of the pixel block 201b, an area occupied by the image in the pixel block 201b is effectively obtained. Since the area occupied by the image in the pixel block 201b corresponds to a pixel value of the image within the pixel block, the adjustment unit 110 can thus adjust the pixel value of the pixel block 201b according to the adjustment parameter determined by the estimation unit 115. Accordingly, the calculation unit 105 respectively calculates intersection points X3~X5, and the estimation unit 115 respectively obtains adjustment parameters corresponding to the intersection points X3~X5, so that the adjustment unit 110 can adjust the pixel values of the pixel blocks 201c-201e according to the corresponding adjustment parameters.

After the adjustment unit 110 finishes adjusting the pixel values, the image perceived by the human eye is as shown by the dots in the pixel blocks in FIG. 2. Supposing the image is a single-color image, the pixel blocks with less dots (e.g., 201a-201e) appear lighter in color while other pixel blocks with more dots appear more intense in color. Although the adjusted pixel blocks 201a-201e does not truly reflect the edge L1 of the image to its entirety, however, as a result of the blurring processing by the image processing apparatus 100, the human eye is not presented with obvious image artifact, thus reducing visual discomfort associated with the foregoing prior art. Further, the image having undergone the blurring processing is possibly a foreground image, which is to be blended with a background image to produce a final image to be displayed. Due to the blending of the foreground with the background, it becomes even less likely that the blurred jagged image artifact is to be detected by the human eye. From a system performance's perspective, the calculation unit 105, the estimation unit 115 and the adjustment unit 110 of the image processing apparatus 100 are operated based on simple mathematical calculations and logic operations. Hence, compared with the conventional solutions that calculate ratios using the oversampling technique, the image processing apparatus according to the embodiment of the invention is capable of preventing over-compromising the overall system performance to provide an advantage of satisfying real-time image processing requirements.

Figure 3:
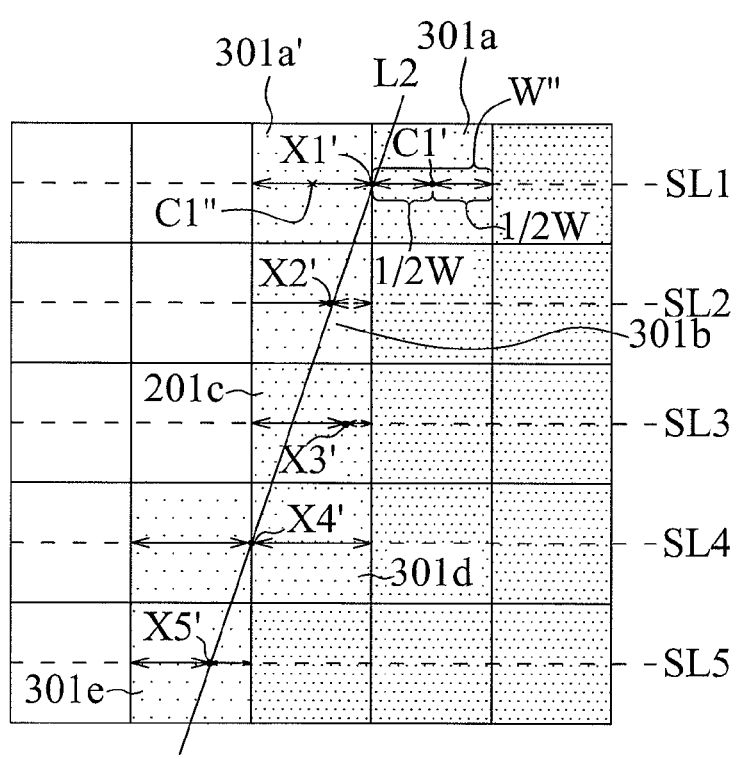

Referring to FIG. 3, an image area comprises 5×5 pixel blocks, a bold straight line L2 represents an edge of an image that is located at the right side of the bold straight line, and the image processing apparatus 100 is applied to process pixel values of five pixel blocks 301a-301e. Taking the intersection point X1' formed by the pixel block 301a and the horizontal scan line SL1 for example, the calculation unit 105 first calculates a coordinate of the intersection point X1'. Next, the estimation unit 115 judges a relative position relationship between the image and the intersection point X1', and determines that the image within the pixel block 201a is situated at the right side of the intersection point X1'. Based on the relative position relationship, the estimation unit 115 further determines that the intersection point X1' is located at a border between the pixel blocks 301a and 301a', i.e., at an adjoining border of the neighboring pixel blocks 301a and 301a'. At this point, the estimation unit 115 calculates a slope of the edge L2 of the image, and estimates a relative ratio of image within the pixel block according to the slope and the relative position relationship to obtain an adjustment parameter, so that the adjustment unit 110 can adjust the pixel value of the pixel block 301a according to the adjustment parameter determined by the estimation unit 115. For example, for the pixel block 301a, when the estimation unit 115 determines that the intersection point X1' is located at the border of the pixel block 301a, it still judges whether the image covers a center C1' of the pixel block 301a. When it is judged that the image covers the center C1' of the pixel block 301a, the estimation unit 115 adds a width distance (½×W) between the intersection point X1' and the center C1 to a half of a width distance W of the pixel block 301a to obtain a width W1" (i.e., the width W" equals the width distance W), and divides the width W1' by the width distance W of the pixel block to obtain a preliminary adjustment parameter of 1. The estimation unit 115 then calibrates the preliminary adjustment parameter according to the slope to obtain a final adjustment parameter, with the reasons for such practice explained below. When an intersection point formed by an edge of an image and a horizontal scan line is located at a border between two pixel blocks, i.e., the intersection point is at an adjoining border of two neighboring pixel blocks, an area substantially occupied by the image in the pixel block cannot be effectively represented supposing a pixel value of the pixel block is adjusted by the preliminary adjustment parameter. Taking the pixel block 301a for example, the corresponding preliminary adjustment parameter calculated signifies that the image occupies the entire area of the pixel block 301a when in fact the image does not occupy the entire area of the pixel block 301a. Thus, supposing the preliminary adjustment parameter is directly utilized to determine the pixel value of the pixel block 301a, image artifact is surely to be resulted. That is the reason why the estimation unit 115 appropriately calibrates the preliminary adjustment parameter according to the slope of the edge L2 to obtain the final target adjustment parameter and determines the pixel value of the pixel block 301a according to the target adjustment parameter. It is to be noted that, the final target adjustment parameter is between 0 and 1 and is determined by the slope of the edge L2 of the image. In this embodiment, a value of 0 means that the image does not occupy any area of the corresponding pixel block and a value of 1 means that the image occupies the entire area of the corresponding pixel block; however, such example is only a design approach of the embodiment of the invention but is not to limit the invention within.

For the pixel block 301a', after determining that the intersection point X1' is located at the border of the pixel block 301a', the estimation unit 115 still judges whether the image covers a center C1' of the pixel block 301a'. When the estimation unit 115 judges that the image does not cover the center C1" of the pixel block 301a', the estimation unit 115 first calculates a width distance (½×W) between the intersection point X1' and the center C1" and subtracts the width distance (½×W) from a half of a width distance W of the pixel block 301a' to obtain a width (having a value of 0), and divides the width by the width distance W of the pixel block 301a' to obtain a preliminary adjustment parameter in a value of 0. Similarly, the estimation unit 115 then calibrates the preliminary adjustment parameter according to the slope to obtain a final adjustment parameter. Details of and reasons for the calibration are similar to those of the foregoing calibration operation, and shall not be again given for brevity.

For the intersection point X4' formed by the edge L2 of the image and the horizontal scan line SL4 as well as the corresponding pixel block 301d, the estimation unit 115 also adopts the same operations for calculating the adjustment parameter corresponding to the intersection point X1' to calculate the adjustment parameter corresponding to the intersection point X4'. Other intersection points X2', X3' and X5' are not located at borders of the pixel blocks, and thus the estimation unit 115 may optionally reference the slope of the edge L2 of the image when calculating corresponding adjustment parameters. However, to estimate the ratios with better accuracy, the slope of the edge L2 of the image may still be adopted to calculate the adjustment parameters, as such modifications are within the scope of the invention.

Figure 4:
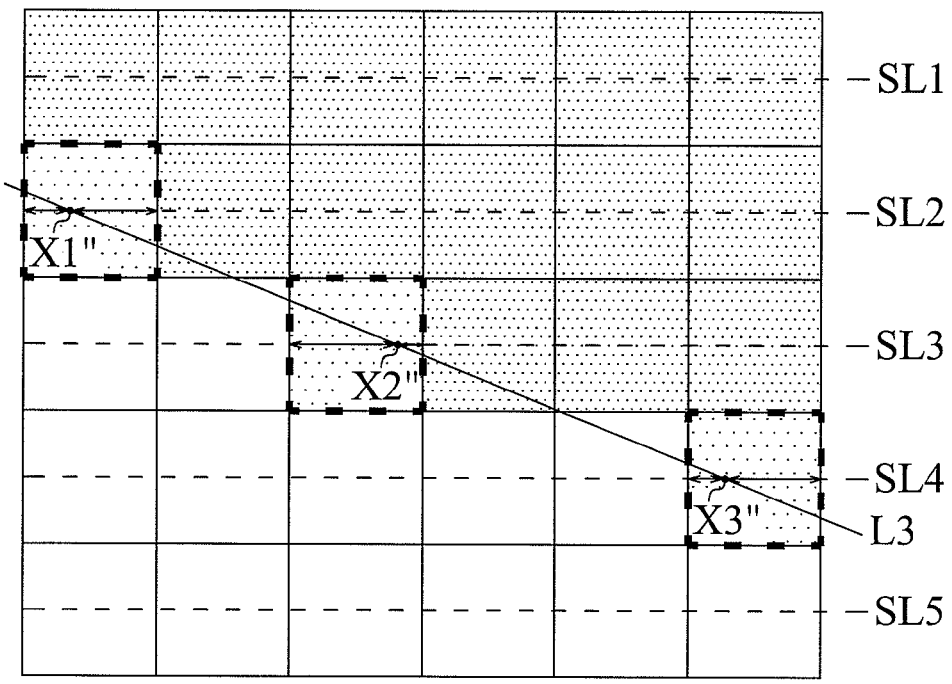
Figure 5:
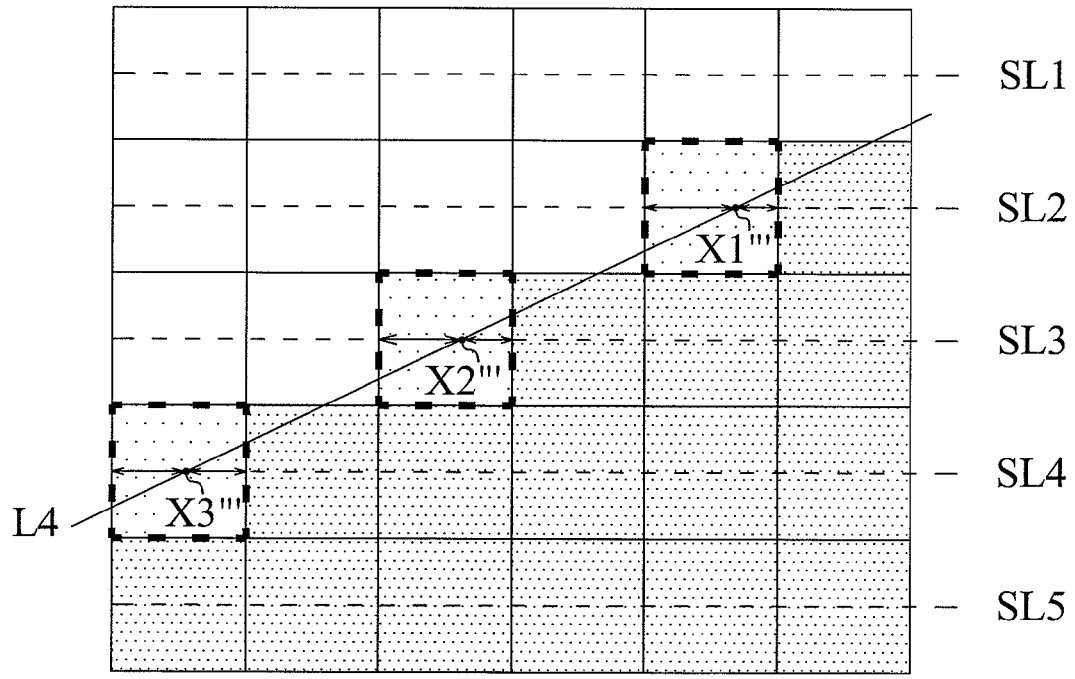
Figure 6:
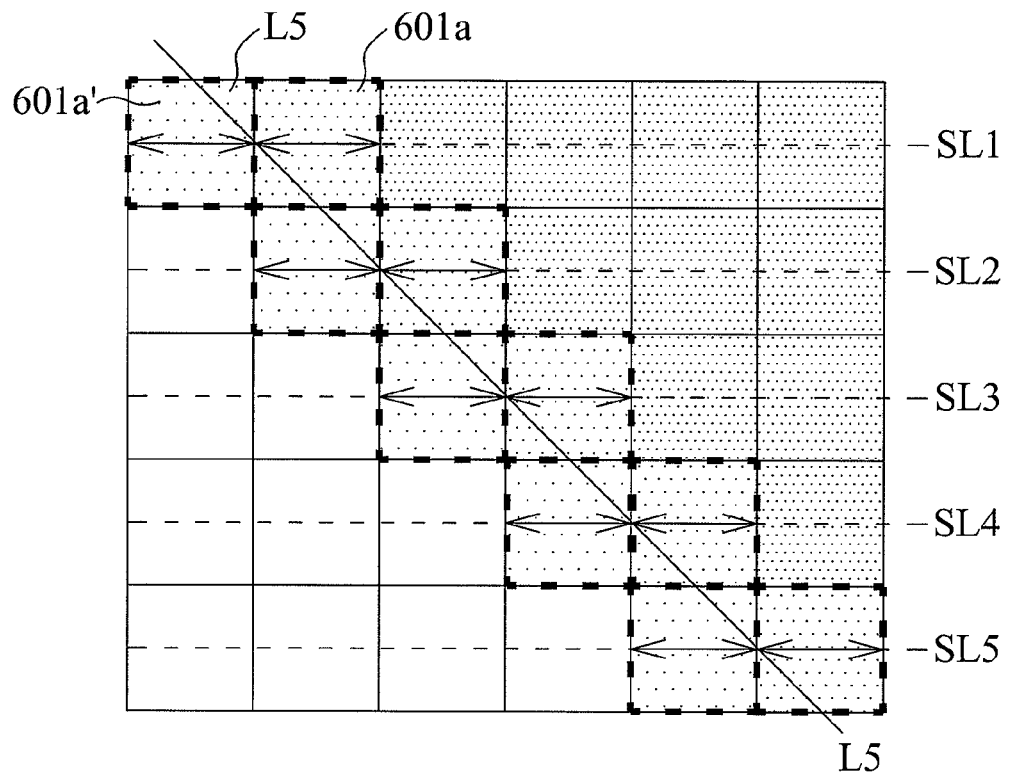
Figure 7:
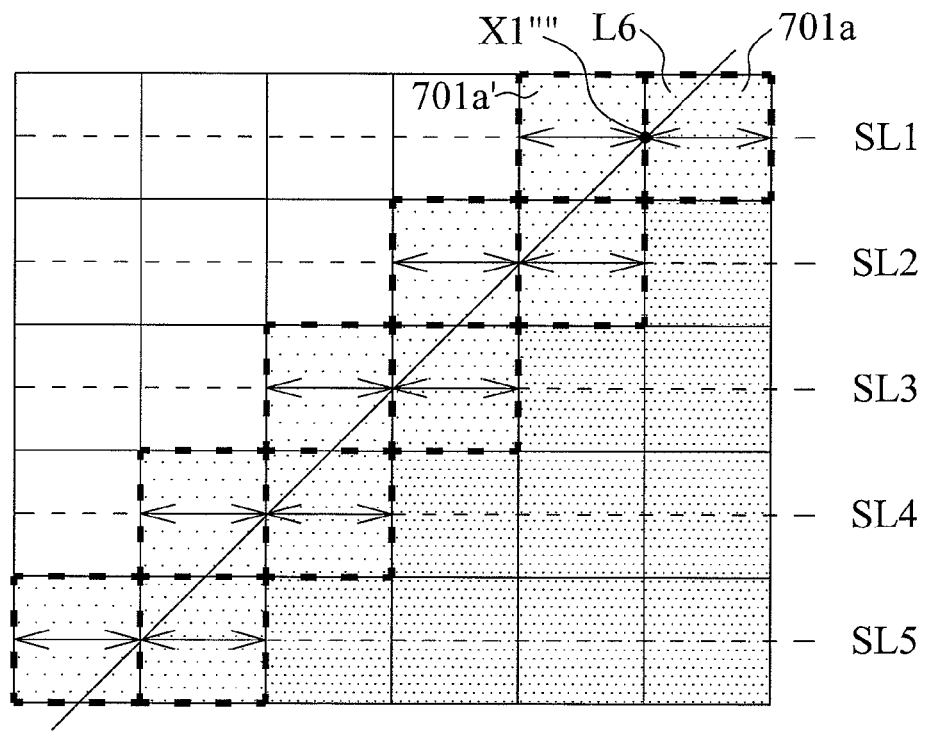
Figure 8:
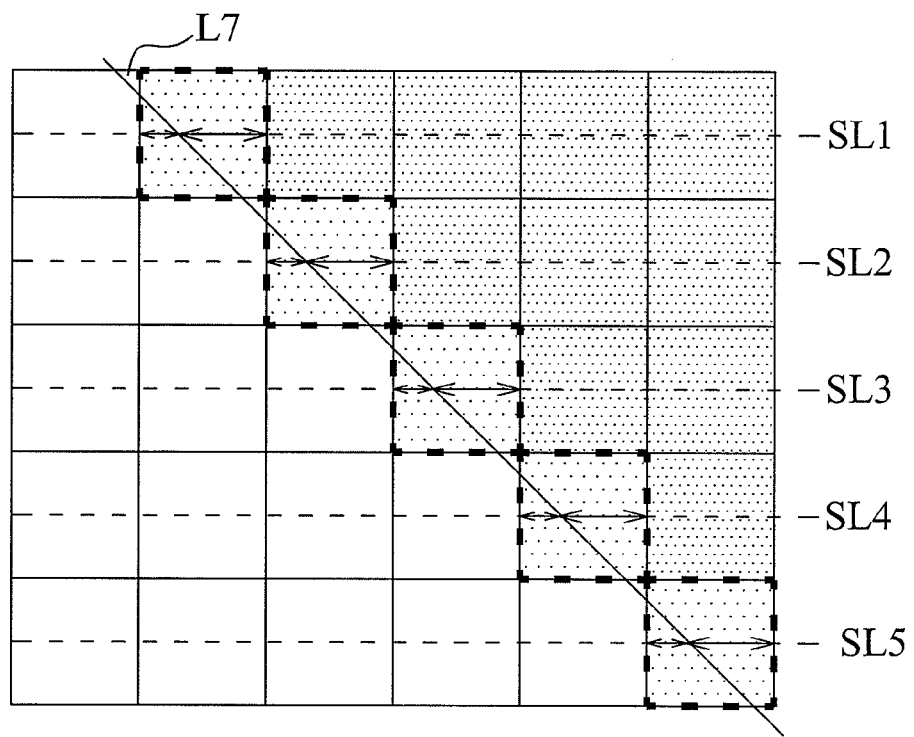
Figure 9:
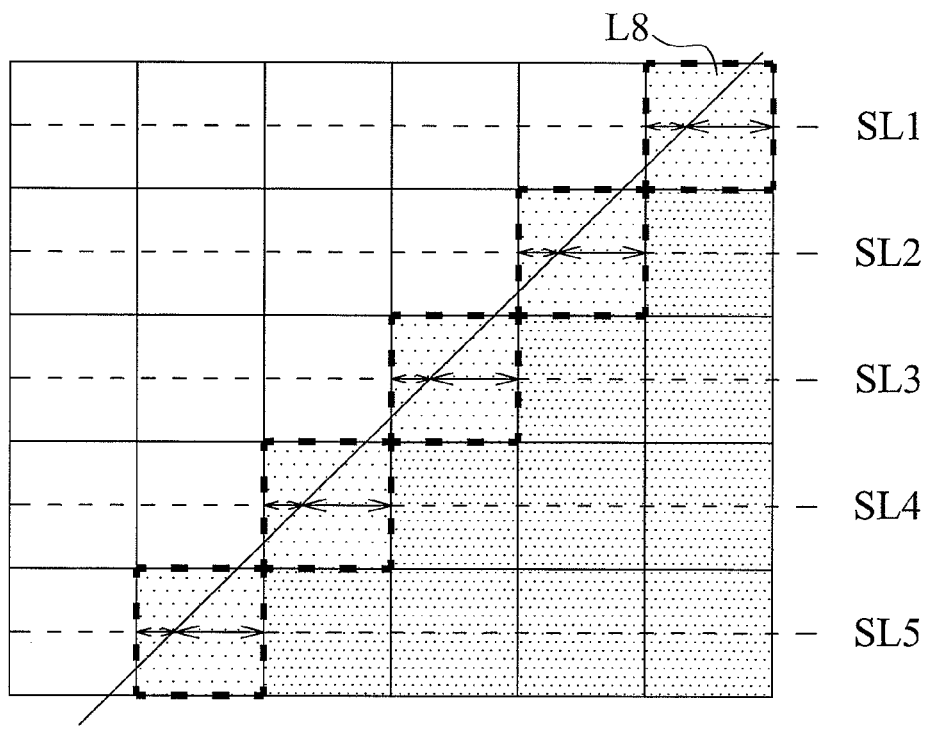
Figure 10:
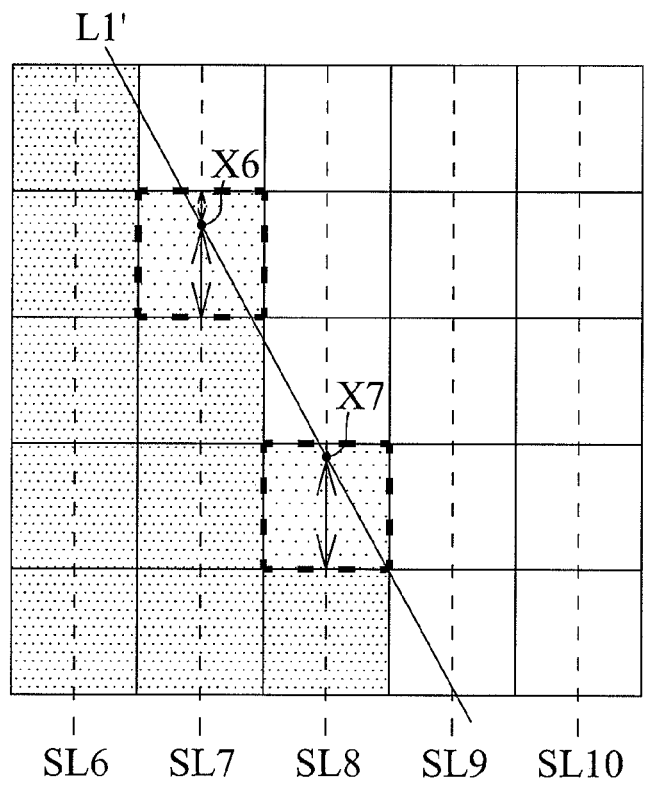
FIGS. 10 to 17 are schematic diagrams illustrating operations of the image processing apparatus shown in FIG. 1 according to a second embodiment of the invention.
Figure 11:
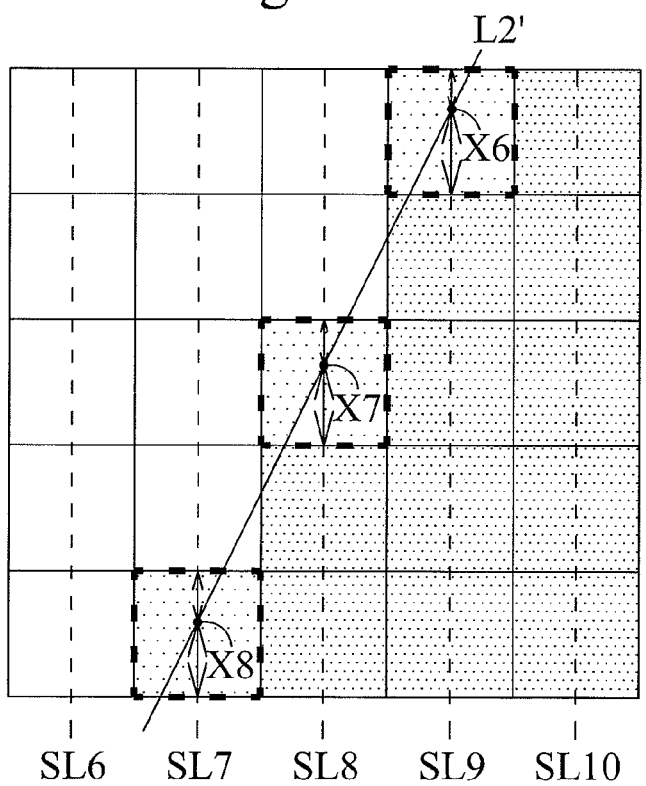

Referring to FIGS. 4 and 5, images are both located at the right side of edges L3 and L4 of the images. Details of how the calculation unit 105 determines intersection points X1" to X3"' in FIG. 4 and X1''' to X3''' in FIG. 5 are similar to those in FIG. 2, and how the estimation unit 115 obtains corresponding adjustment parameters are also similar to those in the foregoing description, so that related operations shall be omitted for brevity. Referring to FIGS. 6 to 9, edges L5 to L9 of images respectively form an included angle of 45 degrees with the horizontal line, and intersection points formed by the edges L5 and L6 and horizontal scan lines SL1~SL5 are located at borders of pixel blocks. Taking a pixel block 601a in FIG. 6 for example, the image does not occupy an entire area of the pixel block 601a but occupies only seven-eighths of the area. Thus, upon acquiring a preliminary adjustment parameter of 1, the estimation unit 115 learns with reference to a slope of the edge L5 that an included angle between the edge L5 and the horizontal scan line is 45 degrees, and further determines that the image in fact occupies seven-eighths of the area of the pixel block 601a rather than the entire area. Therefore, the estimation unit 115 calibrates the preliminary adjustment parameter to obtain a target adjustment parameter of 0.875 (i.e., seven-eighths). The estimation unit 115 may also similarly obtain a corresponding target adjustment parameter (0.875) for pixel blocks (e.g., 701a) shown in FIG. 7 to appropriately adjust pixel values of the pixel blocks. In embodiments shown in FIGS. 8 and 9, included angles between the edges L7 and L8 of images and the horizontal line is 45 degrees; that is, the edges L7 and L8 have slopes of −1 and 1, respectively. However, different from FIGS. 6 and 7, intersection points formed by the edges L7 and L8 with the scan lines SL1~SL5 in FIGS. 8 and 9 do not fall on borders of the pixel blocks, and therefore the estimation unit 115 may optionally reference the slopes of the edges L7 and L8 of the images when calculating corresponding adjustment parameters. However, to estimate the ratios with better accuracy, the slopes of the edges L7 and L8 of the image may still be adopted to calculate the adjustment parameters, as such modifications are within the scope of the invention.

Further, it is possible that an edge of an image is located above or below of the image rather than at the right or left side of the image, which means that for those cases, pixel values of pixel blocks of the image are adjusted with better accuracy when ratios are estimated according to intersection points formed by the edge of the image and vertical scan lines. FIGS. 10 to 17 show schematic diagrams illustrating operations of the image processing apparatus 100 in FIG. 1 according to a second embodiment of the invention. As shown in FIGS. 10 to 13, images are located below edges L1' to L4'. Details of how the calculation unit 105 calculates intersection points (X6 and X7 in FIG. 10, X6' to X8' in FIG. 11, X6" to X11" in FIG. 12, and X6'" to X11'" in FIG. 13) are similar to those for calculating the intersection points in FIGS. 2 and 3, and how the estimation unit 115 obtains corresponding adjustment parameters are also similar. The only difference is that, in FIGS. 10 to 13, the estimation unit 115, with reference to vertical height distances, calculates a ratio between a vertical height of the image from the intersection point to a border of a pixel block and a height distance of the pixel block to obtain an adjustment parameter. As shown in FIGS. 14 to 17, included angles between the edges L5' to L9' of the images and vertical scan lines are 45 degrees, and intersection points formed by the edges L5' and L6' and vertical scan lines SL6 to SL11 are located at borders of pixel blocks. Taking the pixel block 1401a in FIG. 14 for example, the image occupies seven-eighths but not the entire area of the pixel block 1401a. Thus, upon acquiring a preliminary parameter of 1, the estimation unit 115 learns with reference to a slope of the edge L5' that an included angle between the edge L5' and the vertical line is 45 degrees, and further determines that the image occupies seven-eighths of the area of the pixel block 1401a rather than the entire area. Therefore, the estimation unit 115 calibrates the preliminary adjustment parameter to obtain a target adjustment parameter of 0.875 (i.e., seven-eighth), according to which a pixel value of the pixel block 1401a is adjusted. The estimation unit 115 may also similarly obtain a corresponding target adjustment parameter (0.875) for pixel blocks (e.g., 1501a) shown in FIG. 15 to appropriately adjust pixel values of the pixel blocks. In FIGS. 14 to 17, the estimation unit 115 obtains the adjustment parameters from heights with reference to height distances rather than width distances, and hence other similar operation details shall be omitted for brevity. In the embodiment shown in FIGS. 16 and 17, the included angles between the edges L7' and L8' of the images and the vertical line are 45 degrees. The difference between the edges L7' and L8' in FIGS. 16 and 17 and edges L5' and L6' is that the intersection points formed by the edges L7' and L8' and the vertical scan lines SL6 to SL11 do not fall on borders of the pixel blocks, thus the estimation unit 115 may optionally reference the angles of the edges L7' and L8' of the image when calculating corresponding adjustment parameters. However, to estimate the ratios with better accuracy, the angles of the edges L7' and L8' of the image may still be adopted to calculate the adjustment parameter, as such modifications are within the scope of the invention.

Again with reference to FIGS. 3 to 7, after the calculation unit 105 calculates the intersection points formed by the edges of the image and the horizontal scan lines, in the event that the estimation unit 115 determines that the intersection point falls on a border of the pixel block, subsequent adjustment parameter calibration is carried out as follows. Taking the intersection point X1' in FIG. 3 and the intersection point X1'" in FIG. 7 for example, the slope of the edge L2 in FIG. 3 is steeper than that of the edge L6 in FIG. 7; that is, a slope absolute value of the edge L2 is greater than that of the edge L6. On account of the slope absolute values, the area occupied by the image in the pixel block 301a in FIG. 3 is substantially greater than the area occupied by the image in the pixel block 701a in FIG. 7. Therefore, supposing the slope absolute value of the edge L6 is defined as a first value, when the estimation unit 115 calibrates the preliminary adjustment parameter (e.g., 1) after determining that the intersection point X1' in FIG. 3 is located at the border of the pixel block, the preliminary adjustment parameter is first adjusted to the target adjustment parameter of 0.875 corresponding to the first value (i.e., the slope absolute value of 1 of the edge L6). The estimation unit 115 then increases the target adjustment parameter to greater than 0.875 according to a result that the slope absolute value of the edge L2 being greater than the first value to generate the final target adjustment parameter. In contrast, when a slope absolute value of a particular image is smaller than the slope absolute value (i.e., the first value) of the edge L6, the estimation unit 115 decreases the target adjustment parameter to smaller than 0.875 to generate the final target adjustment parameter. Further, for the pixel blocks 301a' and 701a' that do not cover respective centers, on account of the slope absolute values, the area occupied by the image in the pixel block 301a' in FIG. 3 is substantially smaller than that occupied by the image in the pixel block 701a' in FIG. 7. Therefore, supposing the slope absolute value of the edge L6 is defined as a second value, when the estimation unit 115 calibrates the preliminary adjustment parameter (e.g., 0) after determining that the intersection point X1' in FIG. 3 is located at the border of the pixel block, the preliminary adjustment parameter is first adjusted to the target adjustment parameter of 0.125 (i.e., one-eighth) corresponding to the second value (i.e., the slope absolute value of 1 of the edge L6). The estimation unit 115 then decreases the target adjustment parameter to smaller than 0.125 according to a result that the slope absolute value of the edge L2 being greater than the first value to generate the final target adjustment parameter. In contrast, when a slope absolute value of a particular image is smaller than the slope absolute value (i.e., the second value) of the edge L6, the estimation unit 115 increases the target adjustment parameter to greater than 0.125 to generate the final target adjustment parameter.

Figure 12:
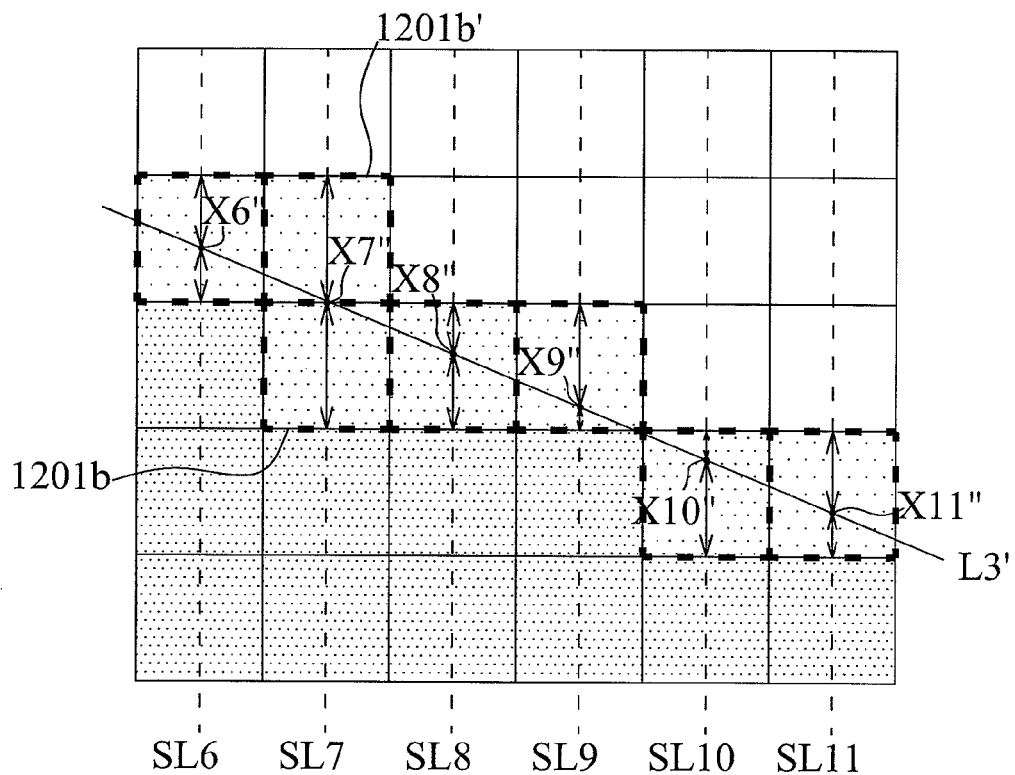
Figure 13:
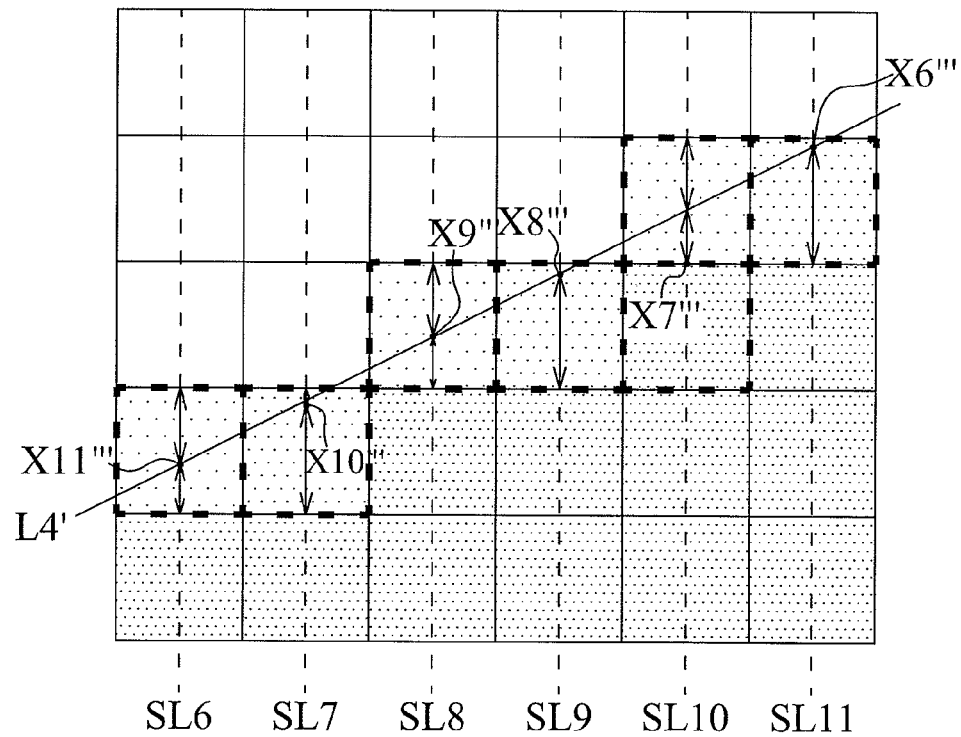
Figure 14:
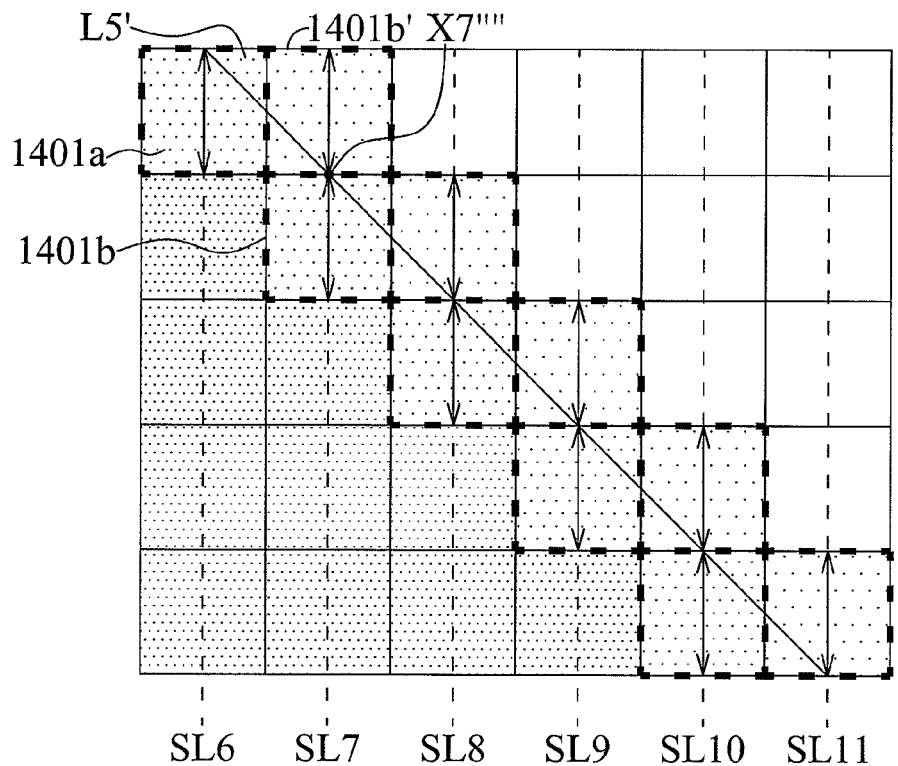
Figure 15:
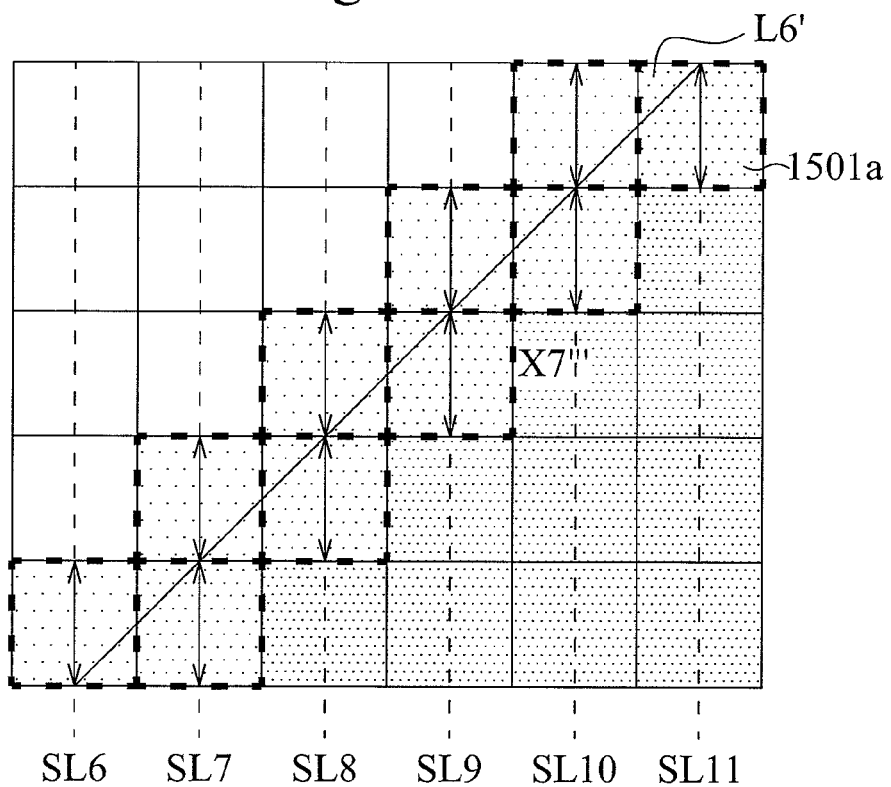
Figure 16:
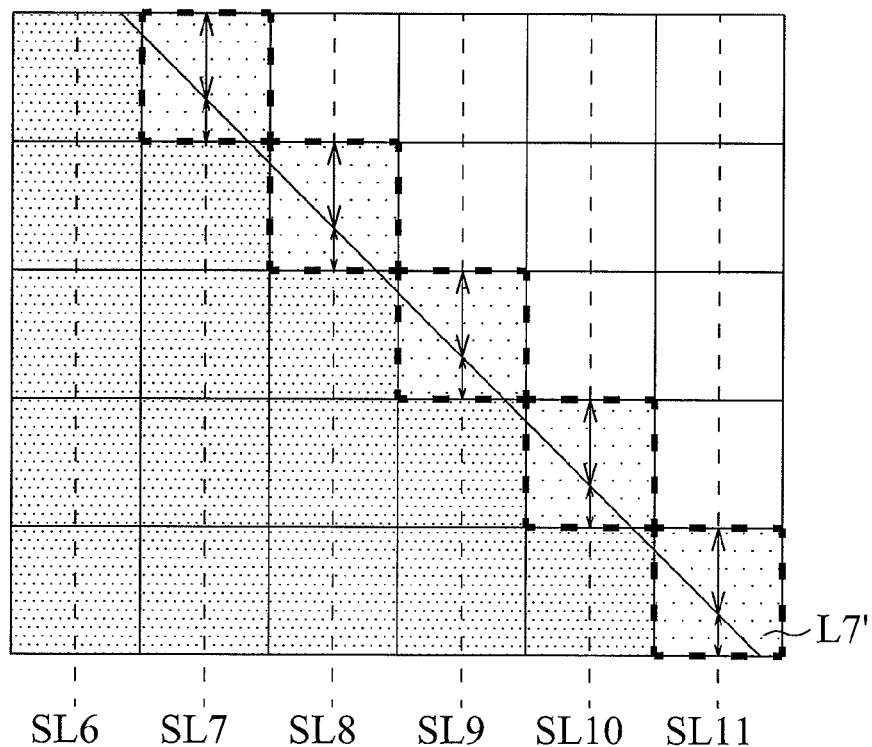
Figure 17:
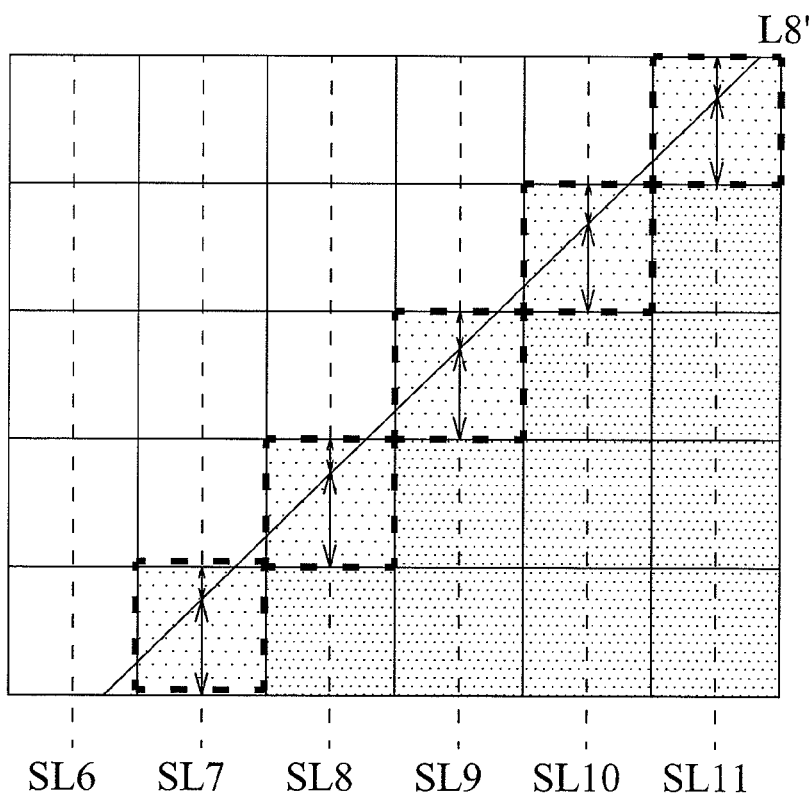
Figure 18:
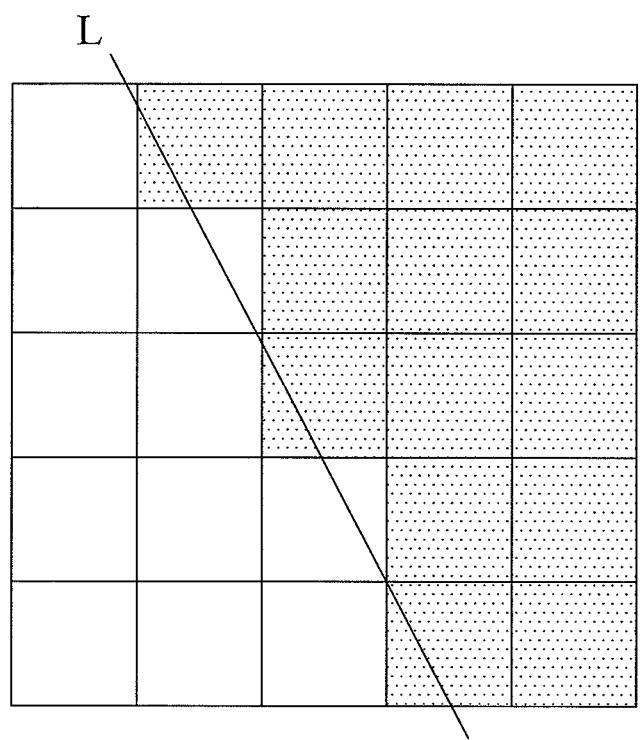
FIG. 18 is a schematic diagram of image artifact associated with the prior art.

For vertical scan lines, the estimation unit 115 operates in a slightly different manner. Taking the intersection point X7" in FIG. 12 and an intersection point X7"" in FIG. 14 for example, the slope of the edge L5' in FIG. 14 is steeper than that of the edge L3' in FIG. 12; that is, a slope absolute value of the edge L5' is greater than that of the edge L3', which means that the area occupied by the image in the pixel block 1201b in FIG. 12 is substantially greater than an area occupied by the image in the pixel block 1401b in FIG. 14. Therefore, supposing the slope absolute value of the edge L6 is defined as a first value, when the estimation unit 115 calibrates the preliminary adjustment parameter (e.g., 1) after determining that the intersection point X7' in FIG. 12 falls on a border of a pixel block, the preliminary adjustment parameter is first adjusted to the target adjustment parameter of 0.875 (i.e., seven-eighths) corresponding to the first value (i.e., the slope absolute value of 1 of the edge L5'). The estimation unit 115 then increases the target adjustment parameter to greater than 0.875 according to a result that the slope absolute value of the edge L3' being smaller than the first value to generate the final target adjustment parameter. In contrast, when a slope absolute value of a particular image is greater than the slope absolute value (i.e., the first value) of the edge L5', the estimation unit 115 decrease the target adjustment parameter to smaller than 0.875 to generate the final target adjustment parameter. Further, for the pixel blocks 1201b' and 1401b' that do not cover respective centers, on account of the slope absolute values, the area occupied by the image in the pixel block 1201b' in FIG. 12 is substantially smaller than that occupied by the image in the pixel block 1401b' in FIG. 14. Therefore, supposing the slope absolute value of the edge L5' is defined as a second value, when the estimation unit 115 calibrates the preliminary adjustment parameter (e.g., 0) after determining that the intersection point X7" in FIG. 12 falls on a border of a pixel block, the preliminary adjustment parameter is first adjusted to the target adjustment parameter of 0.125 (i.e., one-eighth) corresponding to the second value (i.e., the slope absolute value 1 of the edge L5'). The estimation unit 115 then decreases the target adjustment parameter to smaller than 0.125 according to a result that the slope absolute value of the edge L3' being smaller than the first value to generate the final target adjustment parameter. In contrast, when a slope absolute value of a particular image is greater than the slope absolute value (i.e., the second value) of the edge L5', the estimation unit 115 increases the target adjustment parameter to greater than 0.125 to generate the final target adjustment parameter.

It is to be noted that, in other embodiments, when the estimation unit 115 determines that an intersection point calculated by the calculation unit 105 is located at an adjoining border of two neighboring pixel blocks (first and second pixel blocks), the estimation unit 115 defines that a total of adjustment parameters corresponding to the two neighboring pixel blocks equals 1. For example, with reference to FIG. 3, the estimation unit 115 defines that adjustment parameters corresponding to the pixel blocks 301a and 301a' add up to 1, with the adjustment parameter corresponding to the pixel block 301a being greater than the adjustment parameter 301a' corresponding to the pixel block 301a'. The basis for such adjustment parameter definition is that the area covered by the image in the pixel block 301a and the area covered by the image in the pixel block 301a' substantially add to an entire area of one pixel block, and thus the adjustment parameters of the two neighboring pixel blocks are defined to 1. Further, with reference to FIG. 6, the adjustment parameters of the pixel blocks 601a and 601a' also add up to 1—the adjustment parameter corresponding to the pixel block 601a is 0.875, and corresponding to the pixel block 601a' is 0.125. Adjustment parameters of other pixel blocks in the foregoing embodiments may also be defined similarly; however, such example is for illustration purposes only and shall not be construed as limiting the invention.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image processing method, for adjusting an edge pixel value of an image, comprising:
    calculating an intersection point formed by an edge of the image and a pixel scan line;
    estimating a relative ratio of the image within a pixel block corresponding to the intersection point, and accordingly generating an adjustment parameter; and
    adjusting a pixel value of the pixel block according to the adjustment parameter,
    wherein the generating the adjustment parameter step comprises:
        determining a relative position relationship between the image and intersection point; and
        estimating the relative ratio of the image within the pixel block according to the relative position relationship and the intersection point to generate the adjustment parameter, and
    wherein the pixel scan line is a horizontal scan line, and the generating the adjustment parameter step further comprises:
        estimating a ratio of a horizontal distance from the intersection point to a border of the pixel block to a horizontal width of the pixel block to generate the adjustment parameter.

2. The image processing method as claimed in claim 1, wherein the generating the adjustment parameter step generates the adjustment parameter by further referencing whether the image covers a center of the pixel block and a slope of the edge of the image.

3. An image processing method, for adjusting an edge pixel value of an image, comprising:
    calculating an intersection point formed by an edge of the image and a pixel scan line;
    estimating a relative ratio of the image within a pixel block corresponding to the intersection point, and accordingly generating an adjustment parameter; and
    adjusting a pixel value of the pixel block according to the adjustment parameter,
    wherein the generating the adjustment parameter step comprises:
        determining a relative position relationship between the image and intersection point; and
        estimating the relative ratio of the image within the pixel block according to the relative position relationship and the intersection point to generate the adjustment parameter, and
    wherein the pixel scan line is a vertical scan line, and the generating the adjustment parameter step further comprises:
        estimating a ratio of a vertical distance from the intersection point to a border of the pixel block to a vertical height of the pixel block to generate the adjustment parameter.

4. An image processing apparatus, for adjusting an edge pixel value of an image, comprising:
    a calculation unit configured to calculate an intersection point formed by an edge of the image and a pixel scan line;
    an estimation unit configured to estimate a relative ratio of the image within a pixel block corresponding to the intersection point, and accordingly generate an adjustment parameter; and
    an adjustment unit configured to adjust a pixel value of the pixel block according to the adjustment parameter,
    wherein the estimation unit is further configured to determine a relative position relationship between the image and the intersection point, and estimate the ratio of the image within the pixel block according to the relative position relationship and the intersection point to generate the adjustment parameter, and wherein the pixel scan line is a horizontal scan line, and the estimation unit is further configured to estimate a ratio between a horizontal distance from the intersection point to a border of the pixel block to a horizontal width of the pixel block to generate the adjustment parameter.

5. The image processing apparatus as claimed in claim 4, wherein the estimation unit is configured to generate the adjustment parameter further according to whether the image covers a center of the pixel block and a slope of the edge of the image.

6. The image processing apparatus as claimed in claim 4, wherein when the intersection point is located at a border of the pixel block, the estimation unit is configured to estimate the relative ratio of the image within the pixel block according to the relative position relationship and a slope of the edge to generate the adjustment parameter.

7. The image processing apparatus as claimed in claim 6, wherein when the intersection point is located at the border of the pixel block, the estimation unit is further configured to generate another adjustment parameter to adjust a pixel value of another pixel block neighboring to the pixel block at the intersection point, and the adjustment parameter and the another adjustment parameter add up to 1.

* * * * *